(12) United States Patent
Williamson

(10) Patent No.: US 8,720,849 B2
(45) Date of Patent: May 13, 2014

(54) LOW GAIN PRESSURE RELIEF VALVE FOR A FLUID PUMP

(75) Inventor: Matthew Williamson, Richmond Hill (CA)

(73) Assignee: Magna Powertrain Inc. (CA)

( * ) Notice: Subject to any disclaimer, the term of this patent is extended or adjusted under 35 U.S.C. 154(b) by 258 days.

(21) Appl. No.: 13/096,560

(22) Filed: Apr. 28, 2011

(65) Prior Publication Data

US 2012/0248362 A1    Oct. 4, 2012

Related U.S. Application Data

(60) Provisional application No. 61/470,403, filed on Mar. 31, 2011.

(51) Int. Cl.
*F16K 31/00* (2006.01)
*F16K 39/00* (2006.01)
*F16K 11/07* (2006.01)

(52) U.S. Cl.
USPC .......................... 251/63; 251/282; 137/625.69

(58) Field of Classification Search
USPC ................ 251/62, 63, 63.5, 282; 137/625.37, 137/625.69, 625.34
See application file for complete search history.

(56) References Cited

U.S. PATENT DOCUMENTS

| | | | | |
|---|---|---|---|---|
| 2,702,049 | A * | 2/1955 | Seeloff | 137/625.69 |
| 4,155,535 | A * | 5/1979 | Seamone | 251/282 |
| 5,069,111 | A * | 12/1991 | Loffler et al. | 91/516 |
| 6,116,272 | A | 9/2000 | Kratzet | |
| 6,481,458 | B2 | 11/2002 | Hirano et al. | |
| 6,488,479 | B1 | 12/2002 | Berger | |
| 7,775,503 | B2 | 8/2010 | Zhou | |
| 2007/0051414 | A1* | 3/2007 | Nakai et al. | 137/625.69 |
| 2007/0144596 | A1* | 6/2007 | Lohrberg et al. | 137/625.69 |
| 2008/0245323 | A1 | 10/2008 | Williamson | |

FOREIGN PATENT DOCUMENTS

WO    2006/032132 A1    3/2006

* cited by examiner

*Primary Examiner* — John K Fristoe, Jr.
*Assistant Examiner* — Michael R Reid
(74) *Attorney, Agent, or Firm* — Warn Partners, P.C.

(57) ABSTRACT

A pressure relief valve for use in regulating discharge fluid pressure of a pump. A first wall of the outlet intersects with the wall of the passage of the pressure relief valve. The housing includes a counterbore at the intersection of wall of the passage and the first wall of the outlet port to provide a counterbore surface that is perpendicular to the wall of the passage around the outer circumference of the valve body. The top end of the valve body includes a reduced diameter portion and a tapered portion between the reduced diameter portion and the top of the valve body.

14 Claims, 6 Drawing Sheets

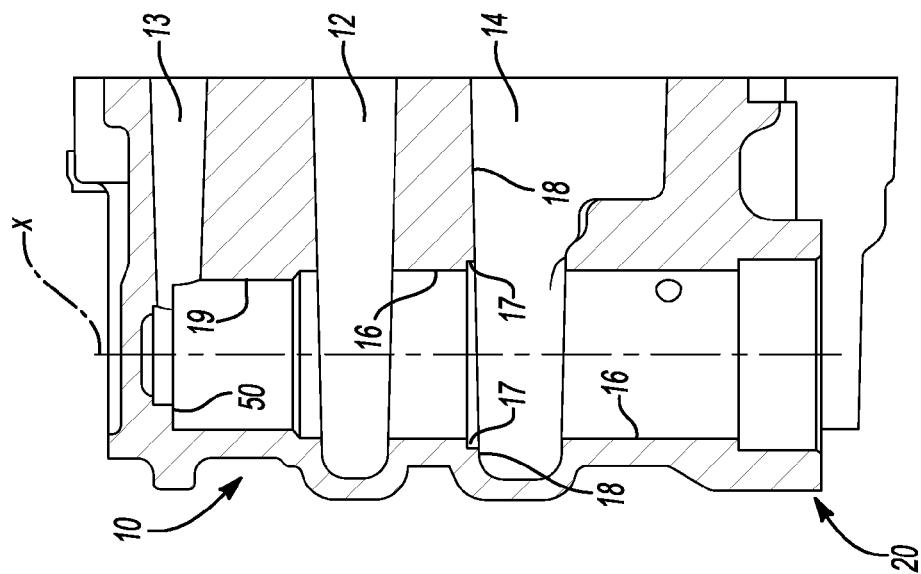
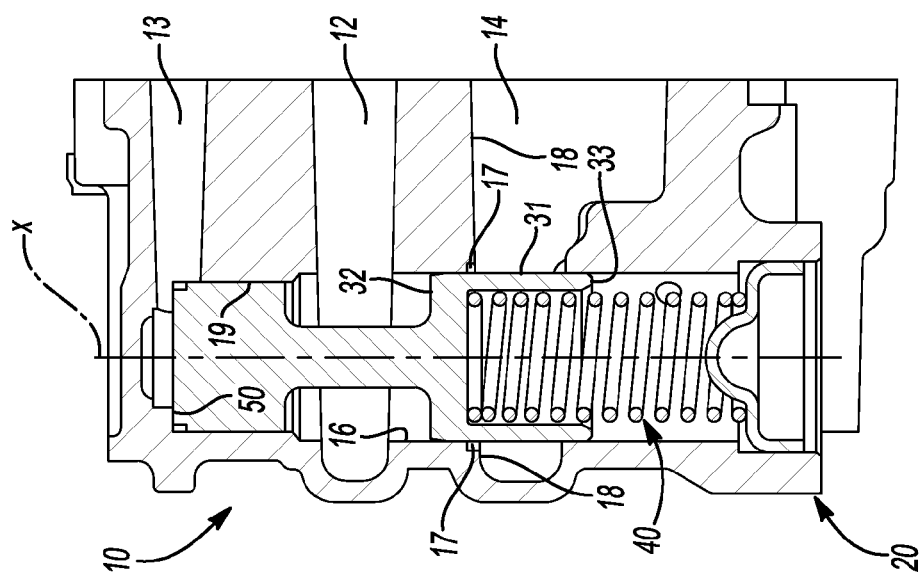
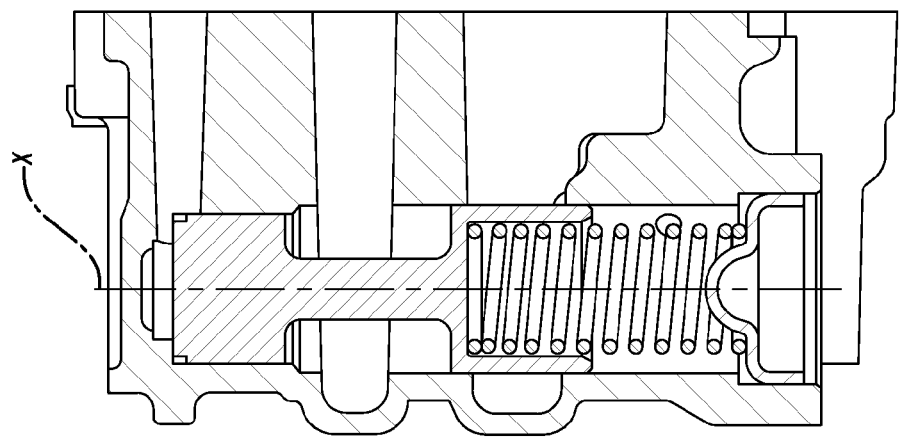
Fig - 3
Fig - 2
Fig - 1
PRIOR ART

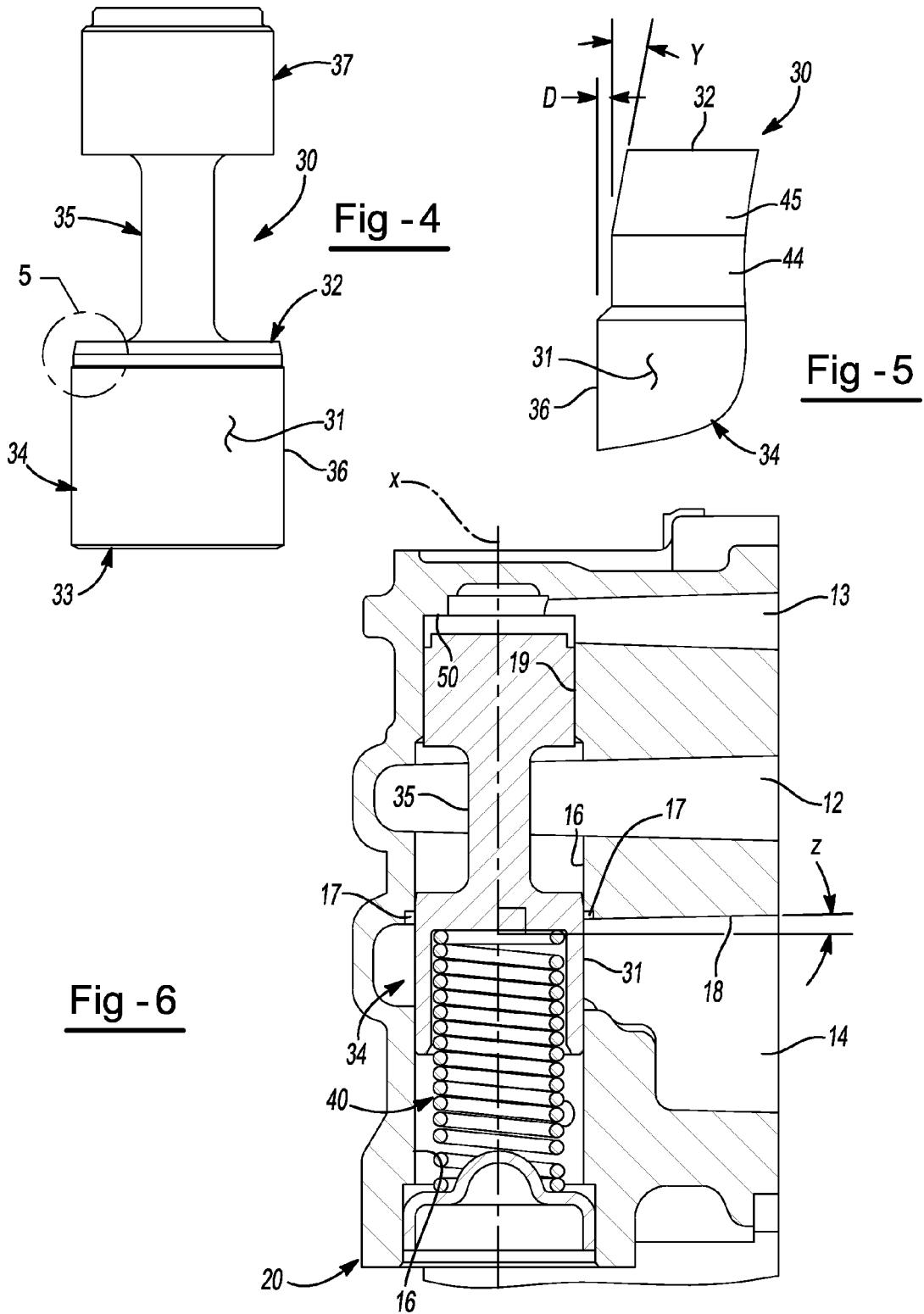

$$\text{Gain} = \frac{\text{Output}}{\text{Input}} = \frac{\text{Valve\_Flow}}{\text{Applied\_Pressure}} = \frac{1}{\text{Hydraulic\_Resistance}}$$

LOW GAIN PRESSURE RELIEF VALVE FOR A FLUID PUMP

CROSS-REFERENCE TO RELATED APPLICATIONS

This application hereby claims priority to, and the benefit of, U.S. application Ser. No. 61/470,403, filed Mar. 31, 2011, entitled LOW GAIN PRESSURE RELIEF VALVE FOR A FLUID PUMP, to inventor Matthew Williamson, the entire contents of which is incorporated herein for all benefits and purposes.

FIELD

The present disclosure relates generally to an oil pump assembly including a low gain pressure relief valve for managing oil pump discharge pressure in an engine. More particularly, the present disclosure relates to a pressure relief valve having particular application in a pump of a lubrication system in an internal combustion engine of a vehicle.

DISCUSSION OF RELATED ART

It is generally known to provide an internal combustion engine including an oil pump assembly for pumping engine oil through the engine to lubricate the engine components through the various lubrication channels in the engine (also generally known as passageways and collectively referred to as the engine gallery). It is known to have the oil pump driven by the engine and for the speed of the oil pump to vary with the speed of the engine. It is also known to provide the oil pump assembly with a device, such as a pressure relief valve, to regulate the pressure within the oil pump assembly and engine. Pressure relief valves are also known for use in any other application where it is generally advantageous to manage overpressure of a fluid in a particular assembly or application. In an engine for a vehicle, it is generally known to use the pressure relief valve to regulate the discharge pressure during engine operation to satisfy the engine's oil pressure limits and to attempt to provide energy management to the oil pump.

Pumps for incompressible fluids, such as oil, are often either gear pumps, gerotor, or vane pumps but could be any known or appropriate type. In environments such as an automotive engine lubrication system, an oil pump will operate over a wide range of speeds when the oil pump is coupled to the engine and runs at the same speed as the engine operating speed. In such an application, the oil pump speed varies resulting in varying the output volume and the output pressure of the oil. This is particularly accurate since the engine lubrication system can be modeled as a fixed size orifice and the pump changes speed with their operating speed, as the engine speed increases, the outlet pressure of the oil pump will increase. Generally, an engine requires the lubrication oil pressure to increase from a minimum pressure level to a maximum pressure level as the engine operating speed increases, but the maximum necessary or desirable oil pressure is generally obtained before the engine reaches its maximum operating speed. Thus, typically, as the engine operating speed and the oil pump speed increase (i.e., the oil pressure continues to increase), at some point, the oil pump will provide an oversupply of lubrication oil over a significant portion of the engine operating speed range. While a deprivation of oil can result in damage to engine components, over-pressurized oil is also undesirable. For example, too high an oil pressure can destroy paper filter elements and have other undesirable effects on the engine and can result in excess power consumption.

To prevent or limit over-pressurized oil in the system and engine, it is generally know for the lubrication system to include the pressure relief valve. To control this oversupply, and the resulting over pressure which could otherwise damage engine components, constant displacement pumps in such environments are typically provided with a pressure relief valve which allows the undesired portion of the over-supplied oil to return to an oil sump or tank or back to the inlet of the oil pump so that only the desired volume, and hence pressure, of fluid is supplied to the lubrication system of the engine. The pressure relief valve is connected with the oil pump and engine to vent oil back into the oil sump (i.e., to the oil pump's suction side) when the oil pressure reaches a preset limit. One known type of pressure relief valve is disclosed in U.S. Pat. No. 6,116,272, wherein the pressure relief valve is integrated into the oil pump. The pressure relief valve includes a piston positioned within a cylindrical passage or bore and the piston is biased in one direction (i.e., toward the closed position) by a spring. Pressurized oil from the oil pump outlet is supplied to one side of the piston (i.e., the side opposite the biasing or spring force applied to the piston) and forces the piston against the spring. As the engine rotates faster, the oil pump also rotates faster and works harder and the oil pressure increases. As the oil pressure increases, the piston in the oil pressure relief valve moves against the spring and within the bore to a point where vents on the edges of the piston allow oil to escape back to the sump or the inlet of the pump. With this type of conventional oil pressure relief valve, the oil pump outlet pressure is used to determine when the oil pressure relief valve will open to internally by-pass the high pressure oil from the discharge side of the oil pump back to the suction side of the oil pump. A typical oil pressure relief valve of this type would be set to open at a preset pressure level appropriate for the particular engine and application.

Although such a conventional oil pressure relief valve is simple and reliable, it has known limitations and drawbacks that can have an adverse impact on the oil pump's power consumption making it relatively higher. High power consumption by the oil pump equates to reduced fuel efficiency, which long remains a significant disadvantage.

In one known application, such as that disclosed in U.S. Pat. No. 6,481,458, a pressure relief valve assembly includes a progressively shaped exit hole of an oil pressure relief valve for use in the lubrication system of an engine. Another such example is disclosed in U.S. Pat. No. 7,775,503. In particular, the U.S. Pat. No. 6,481,458 reference discloses and teaches that the relief inflow portion is formed on one end of the valve housing and a relief discharge portion formed at an intermediate location of the valve path of the valve housing and includes small aperture portions and large aperture portions formed in communication with one another. The relief discharge portions are provided with the small aperture portions in the side near the relief inflow portion. However, in some circumstances (such as occurs where the valve spring force at the opening position is relatively low as in a pressure relief valve having multiple operating pressures, such as when a pilot pressure is supplied to the pressure relief valve) such hole shapes have drawbacks since the contamination resistance (due to particles in the oil) of the valve is compromised for some small particle sizes. For example, such small particles may occur from casting sand and other contaminants in the oil from the casting of the metal housing for the pressure relief valve or oil pump housing and wherein the pressure setting at which the pressure relief valve must function is relatively lower such as in an oil pump system with a pump with selectable outlet pressures as described in WO2006032132A1, filed Sep. 20, 2005, entitled Pump With Selectable Outlet Pressure, to inventor Matthew Williamson, the entire contents of which is incorporated herein. In a selectable pressure oil pump and lubrication system, it may be desirable to have a relatively lower operating pressure for the pressure relief valve to reduce energy consumption. In such a system, however, the pressure relief valve must operate with a lower spring force which makes the valve more susceptible to contamination jamming. Similar issues apply in an oil pump assembly and system using closed-loop feedback control of the pressure relief valve such as with a pilot control valve. Conventional methods of reducing the valve gain, such as progressive opening (spill) window shapes, have proven insufficiently robust against contamination when used in conjunction with a relatively low spring force in the pressure relief valve.

There remains a significant need for a low gain pressure relief valve that better manages small particle contamination issues and avoids jamming and self-sustaining oscillations. Accordingly, there remains a significant need for a solution which is acceptably capable of managing and/or eliminating contact between the valve body and the housing when the valve is opening to achieve controllable low gain pressure relief and preserve good robustness against small particle contamination.

SUMMARY

In one exemplary embodiment there is disclosed a pressure relief valve for use in a pump (oil pump) assembly for providing pressurized fluid lubricant (oil) for use in an engine in a vehicle (such as an automobile). In particular, the pressure relief valve has particular utility with selectable output pressure oil pumps and applications including pressure relief valves for use in engines where the pressure relief valve operates at relatively low pressure, such as with a pilot valve. In one exemplary embodiment, the invention relates to an apparatus for use as a low gain pressure relief valve. The pressure relief valve includes a valve housing having a passage or bore including a wall having an end, the passage of the pressure relief valve defining a longitudinal axis of the valve and valve housing. The valve housing includes an inlet port and an outlet port and at least the outlet port has a first wall that intersects with the wall of the passage at an angle less than ninety degrees. The pressure relief valve further includes a valve body for being located within the passage, the valve body including a piston portion having at least one outer circumference portion for engaging the wall of the passage and the piston further including a top and a bottom, the valve body slides or moves in the passage such that the at least one outer circumference portion blocks the inlet port of the valve housing when the valve body is located in a first or closed position and when the valve body is moved sufficiently away from the closed position, the inlet port of the valve housing is no longer blocked by the piston portion but is in communication with the outlet port such that fluid (such as oil) entering the inlet port of the pressure relief valve is communicated through the passage and out the outlet port.

The pressure relief valve further includes a biasing member, such as a spring, for constantly biasing the valve body toward the first or closed position. The inlet port admits the fluid to the top of the piston portion of the valve body to move the valve body against the biasing force of the biasing member as the pressure of the fluid supplied to the inlet port increases sufficiently to move the piston portion against the biasing member to connect the inlet port with the outlet port for expelling the fluid from the passage and out the outlet port. In one exemplary embodiment the valve housing includes an undercut counterbore located at the intersection of the wall of the passage and the first wall of the outlet port. The counterbore includes a first counterbore surface extending in a plane aligned perpendicular to the longitudinal axis of the valve body and perpendicular to the wall of the passage such that the plane of the first counterbore surface is not in the same plane as, and is at an angle with respect to, the first wall of the outlet port.

In the one exemplary embodiment the valve housing is casted in a mold from a metal material and the first wall of the outlet port has a draft angle. More particularly, the draft angle of the first wall of the outlet port is less than about five degrees and, more particularly is less than about two degrees. In one particular embodiment, the draft angle of the first wall of the outlet port is about one and one-half degrees such that the first wall of the outlet port is at an angle from the longitudinal axis equal to ninety degrees minus one and one-half degrees but the first counterbore surface is substantially perpendicular to the longitudinal axis.

In another exemplary embodiment there is disclosed a low gain pressure relief valve for use in a fluid pump (oil pump) assembly for providing pressurized fluid (oil) lubricant for use in an engine in a vehicle (such as an automobile). In one exemplary embodiment, the invention relates to an apparatus for use as a low gain pressure relief valve including a housing having a passage or bore including a wall having an end and wherein the bore of the pressure relief valve defines a longitudinal axis of the valve. The valve housing includes an inlet port and an outlet port and at least the outlet port has a first wall that intersects with the wall of the passage at an angle less than ninety degrees. The pressure relief valve further includes a valve body located within the bore, the valve body including a valve piston having at least one outer circumference portion for engaging the wall of the bore and the valve piston further including a top and a bottom, the valve piston slides or moves in the passage such that the at least one outer circumference portion blocks the inlet port of the valve housing when the valve body is located in a first or closed position and when the valve piston is moved sufficiently away from the closed position, inlet port of the housing is no longer blocked by the valve piston and is in communication with the bore and the outlet port such that fluid entering the inlet port of the low gain pressure relief valve is communicated through the bore and out the outlet port.

The low gain pressure relief valve of the one embodiment further includes a biasing member, such as a spring, for biasing the valve piston toward the first or closed position. The inlet port admits the pressurized fluid to the top of the piston to move it against the biasing force of the spring as the pressure of the fluid increases sufficiently to move the piston against the spring to connect the inlet port with the passage and the outlet port for expelling the fluid from the passage. In one exemplary embodiment, the valve piston, toward its top end, includes a first reduced diameter portion extending from the at least one outer circumference portion and toward the top of the piston, and includes a tapered portion extending from the first reduced diameter portion and toward the top of the piston.

In the one exemplary embodiment, the pressure relief valve includes a piston in a bore wherein the bore in the housing includes a counterbore for creating an opening edge/surface interface that is perpendicular to an axis of the relief valve. This eliminates nearly all contact between the valve and housing near the exit hole when the valve is open to achieve low gain without using a progressively sized exit hole shape and thereby preserving good robustness against small particle contamination.

In one exemplary embodiment there is disclosed a low gain pressure relief valve and system for use in a fluid lubrication system for use in an internal combustion engine having an oil pump for circulating the fluid (hydraulic such as an oil) throughout the lubrication system of the engine. The pressure relief valve and system includes a pressure relief valve including a housing having a bore having a piston therein and defining a longitudinal. The pressure relief valve further includes a pressure relief spring for biasing the piston in a first direction in the bore. The pressure relief valve further includes an inlet port for admitting a fluid from a high pressure side of the fluid lubrication system into the bore to one side (e.g., high pressure) of the piston to move the piston against (i.e., opposite) the force of the pressure relief spring, and an outlet port for expelling the fluid from the bore once the piston has been moved against the increasing spring force to put the inlet port in communication with the outlet port. In one exemplary embodiment of the present invention, the low gain pressure relief valve includes a piston having an outer circumference surface for alignment and sliding engagement with the surface of bore. The outer circumference surface of the piston generally extends from the top of the piston to the end of a skirt of the piston.

In an alternate embodiment of the present invention the pressure relief system includes, in addition to the low gain pressure relief valve, a pilot valve for assisting the pressure relief system. In this embodiment, the pressure relief valve further includes a pressure inlet port for admitting fluid into the bore of the pressure relief valve and applying the pilot valve pressure to the piston in a direction opposite the fluid pressure from the inlet port to the pressure relief valve. In one alternative embodiment of the present invention the pressure relief system includes, in addition to the low gain pressure relief valve, a pilot valve for assisting the pressure relief system. In an alternate embodiment, the present invention relates to an oil pump including the low gain pressure relief valve. In an alternate embodiment, the present invention relates to an engine including an oil pump including the low gain pressure relief valve.

BRIEF DESCRIPTION OF THE DRAWINGS

FIG. 1 is a partial section view showing a pressure relief valve of an engine oil pumping device of the prior art.

FIG. 2 is a partial section view showing a pressure relief valve of an engine oil pump wherein the pressure relief valve is in a closed position.

FIG. 3 is a partial section view showing the pressure relief valve of the embodiment of FIG. 2 with the piston removed.

FIG. 4 is a plan view of the piston of the pressure relief valve according to the embodiment of FIG. 2.

FIG. 5 is a partial, enlarged section of the piston of FIG. 4.

FIG. 6 is a partial section view of the pressure relief valve of the embodiment of FIG. 2 wherein the pressure relief valve is moved from the closed position and toward an open position.

DETAILED DESCRIPTION

Figure 7:
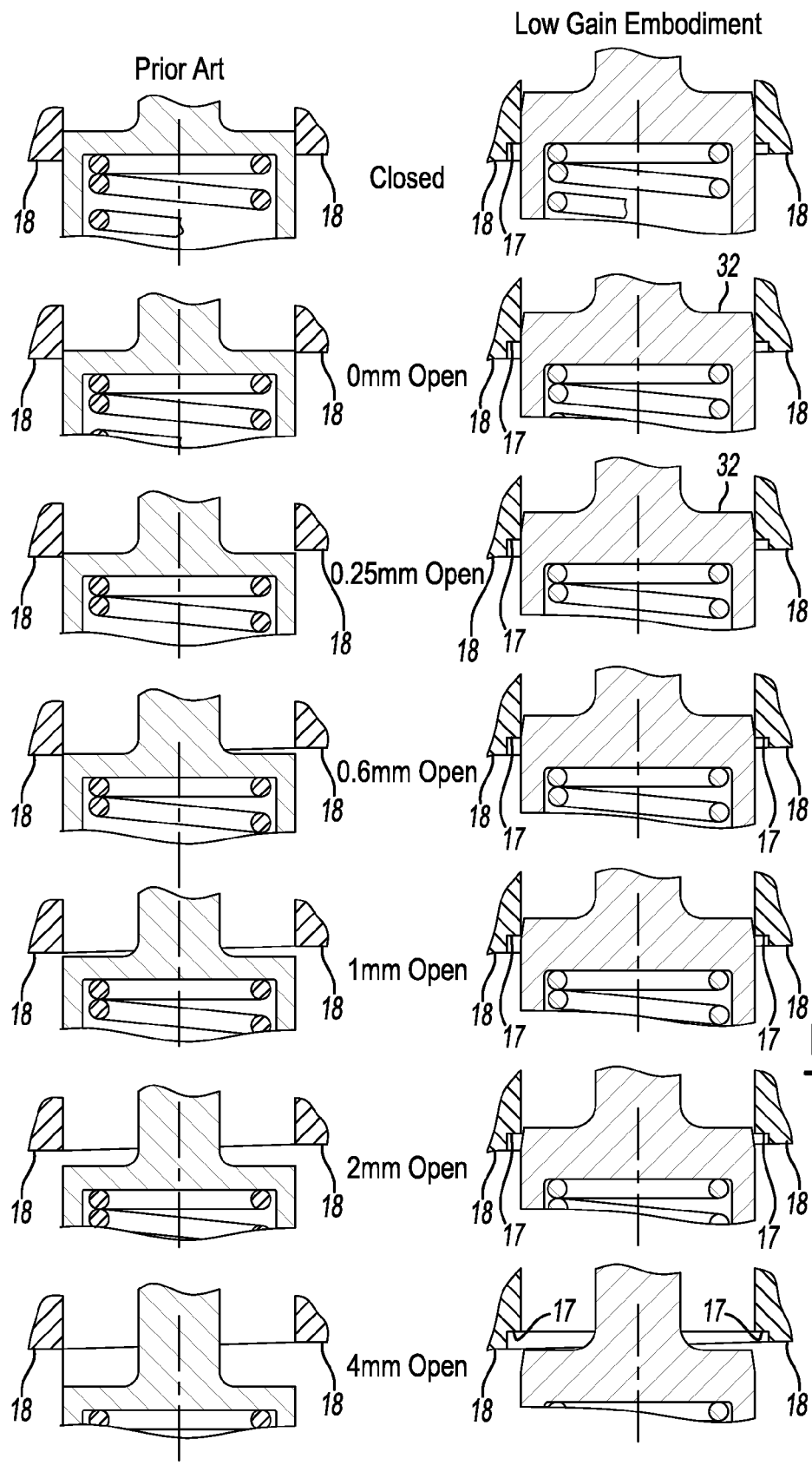
FIG. 7 is a progression of partial section views of the pressure relief valve of the embodiment of FIG. 2 and the embodiment of FIG. 1 moving from a closed position (a) to a fully open position (g).

Referring generally to all of the figures, and in particular to FIG. 2, there is disclosed a new design for a low gain pressure relief valve 10 having particularly utility in a oil pump assembly (not shown) for use in an engine (not shown) such as those used in a vehicle (not shown) and in particular for use in an oil pump in an engine (not shown) in a passenger vehicle (not shown). While the pressure relief valve 10 shown has particular utility in an oil pump assembly for an engine, it should be understood that the pressure relief valve of the present disclosure may have application in similar applications including other known or appropriate applications and environments.

The low gain pressure relief valve 10 includes a valve housing 20 having a valve body passage or bore 16 extending longitudinally therein. The valve housing 20 may be made an integral part of the oil pump assembly, as is the case for the embodiment shown in FIG. 2, or the valve housing 20 may alternatively be made separate from the oil pump assembly and oil pump (not shown). The valve housing 20 is typically made from a metal material and is made as a casted metal (such as aluminum or magnesium) component. The low gain pressure relief valve 10 and the passage 16 further define a longitudinal center axis shown as a dashed line in the Figures. The low gain pressure relief valve 10 has an inlet passage or port 12 and an outlet passage or port 14, as are understood in the relevant art. In one embodiment the low gain pressure relief valve 10 may have additional passages or ports, such as a pilot inlet passage or port 13, for coupling with a pilot valve (not shown) for operating the pressure relief valve at variable or multiple pressures.

The low gain pressure relief valve 10, in the embodiment shown in FIG. 2, includes a valve body or piston 30 (as best shown in FIGS. 4 and 5) located within the passage or bore 16 and includes a first or lower piston 34, a central neck or middle portion 35 and a second or upper piston 37 also located in the bore 16 of the housing 20. The a valve body or piston 30 further includes at least one outer circumference portion 31, as part of the lower piston 34, including a top 32 and a bottom 33 and the at least one outer circumference portion 31 which is located in the bore 16 of the housing 20. As best shown in FIGS. 2, 3 and 6, the bore 16 may have varying diameters along the length of the pressure relief valve 10. Accordingly, the upper end 19 (see FIG. 6) of the bore 16 has a diameter (reduced) different than the central and lower portions of the bore 16.

The pressure relief valve 10 further includes a spring 40 for constantly biasing the body valve 30 in a first direction toward a closed position and at end 50 of the housing 20 wherein the body valve 30 and the at least one outer circumference 31 closes or blocks the inlet 12 of the valve housing 20 as shown in FIGS. 2, 6 and 15-17. The inlet port 12 is for admitting a pressurized fluid (such as oil exiting an oil pump) to the pressure relief valve 10 and to the top 32 of the first piston 34 of the valve body 30 to move the valve body away from the end 50. The inlet port 12 is typically supplied with relatively high pressure fluid from a high pressure side of an oil pump of a fluid lubrication system of the engine. As the engine speed increases, the pressure of the fluid in the inlet 12 increases until the pressure is sufficiently high enough to move the valve body 30 against the biasing force of the spring 40 and toward an open position as is illustrated in the series of partial cross-section images in FIG. 7 wherein the valve body 30 moves from the closed position (at the top of FIG. 7) to a fully open position (4 mm Open, at the bottom of FIG. 7). Once the valve piston 30 is moved a sufficient distance within the bore 16 of the housing 20 and the outer circumference 31 of the piston 34 moves to align with the bottom end of the central bore 16, and relatively high pressure fluid entering the inlet port 12 can be communicated to the relatively lower pressure outlet port 14 for expelling the fluid and returning it to the fluid lubrication system (pump or well).

The housing 20 of the pressure relief valve 10 is preferably produced by die-casting a metal material as is well known. The housing 20 of the pressure relief valve 10 includes the inlet 12 and the outlet 14 being formed during the casting of the housing 20 in a mold (not shown) having a draft angle Z, from a plane perpendicular to the axis X, in one direction as shown in FIG. 6. The draft angle Z corresponds with at least first wall 18 of the outlet 14 but typically corresponds with each wall of the inlet 12, pilot inlet 13 and outlet 14 as is understood. Therefore, the wall 18 of the outlet 14 is at an angle Z (see FIG. 6) with respect to a direction perpendicular to the longitudinal axis X of the pressure relief valve 10. Recall the bore 16 is made in the housing 20 along the axis X Of the housing 20. The wall 18 is at an angle equal to 90°-Z° with respect to the axis X and wall of the bore 16. In one embodiment, the draft angle Z is less than or about five (5) degrees. More particularly, the draft angle Z is less than or about two (2) degrees and in one embodiment, the draft angle Z is approximately one and one-half (1.5) degrees.

In one particular embodiment, the upper end (as viewed in FIGS. 2, 4, 5) of the piston 34, and hence the upper end of the at least one outer circumference portion 31, near the top 32, includes a stepped or shaped portion. In particular, the upper end of the piston 34 includes a reduced diameter portion 44, which diameter is reduced an amount 2 X D, and has an axial extent extending from or at about the top of the outer circumference portion 31 and toward the top 32. The reduced diameter portion 44 is reduced sufficiently so that debris and other contaminants in the fluid or oil of the pressure relief valve 10 will not cause jamming or sticking of the piston 34, and hence the valve body 30, within the passage or bore 16 due to contaminants becoming lodged between the reduced diameter portion 44 and the wall of the bore 16 in the housing 20. Further, the reduced diameter portion 44 allows pressurized fluid to begin flowing between the reduced diameter portion 44 and the wall of the bore 16 before the piston 34 is moved to a completely open position. The reduced diameter portion 44 leads to a tapered portion 45 which extends between the reduced diameter portion 44 and the top 32.

Figure 13:
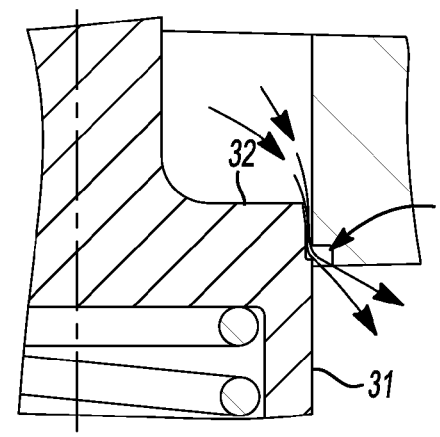
FIG. 13 is a partial section view of the pressure relief valve of the embodiment of FIG. 11 detailing the gap between the piston and the housing wherein the pressure relief valve is moved from the closed position and toward an open position including graphical flow lines.
Figure 14:
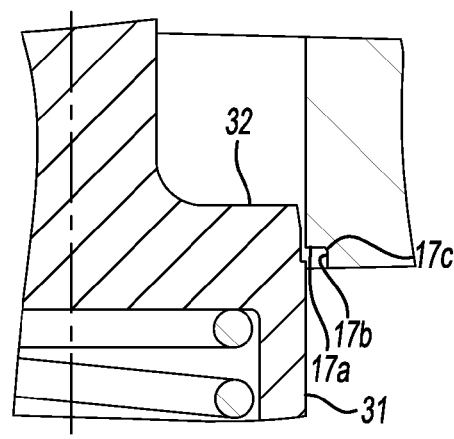
FIG. 14 is a partial section view of the pressure relief valve of the embodiment of FIG. 2 detailing the radial gap between the piston and the housing wherein the pressure relief valve is moved from the closed position and toward an open position.
Figure 15:
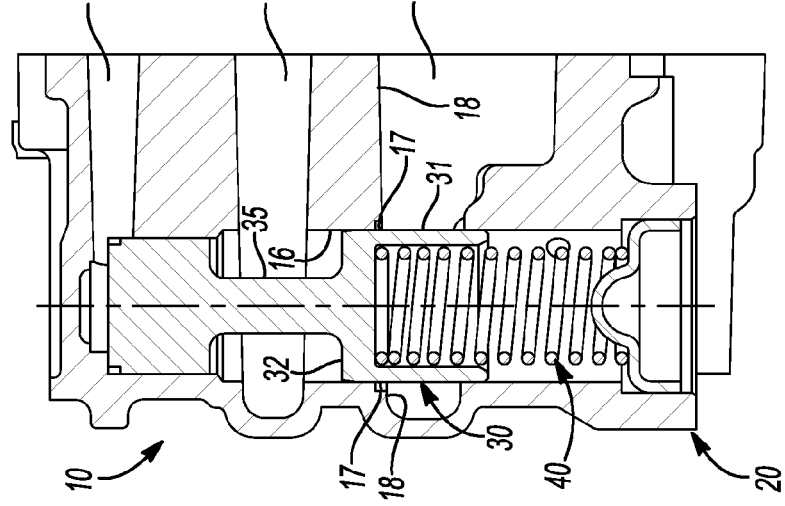
FIG. 15 is a partial section view of a pressure relief valve according to the embodiment of FIG. 2 and manufactured using an undercut counterbore alternative process.

The tapered portion 45 preferably has an angle Y from the reduced diameter portion 44 as best shown in FIG. 5. The angle Y is chosen to provide a low gain flow of the oil in the pressure relief valve 10 as the valve body 30 moves from the closed position (FIG. 2) and to an open position (FIGS. 13 and 14) as best shown in the progression of views in FIG. 7. The angle Y is preferably selected from the range of between about five (5) degrees and about sixty (60) degrees. More particularly, the angle Y is preferably selected from the range of between about ten (10) degrees and about forty-five (45) degrees. In one embodiment, the angle Y is selected to be about ten (10) degrees. The angle Y for the tapered portion 45 is chosen to provide a low gain flow of the oil in the pressure relief valve 10 as the valve body 30 moves from the closed position (FIG. 2) and to an open position (FIGS. 13 and 14) as best shown in the progression of views in FIG. 7.

Figure 12:
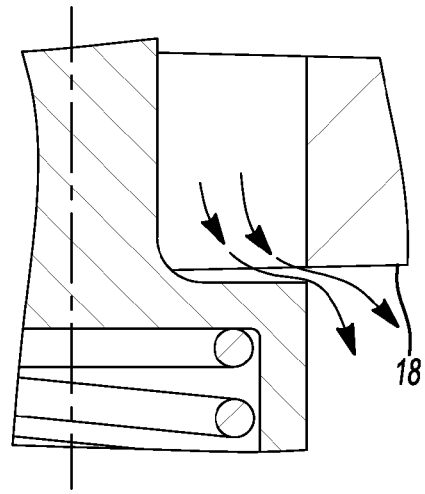
FIG. 12 is a partial section view of the pressure relief valve of FIG. 10 (prior art) detailing the gap between the piston and the housing wherein the pressure relief valve is moved from the closed position and toward an open position including graphical flow lines.

Thus, as the valve body 30 moves toward the open position, the pressure of the fluid will reduce slightly as the reduced diameter portion 44 and tapered portion 45 advance past the end of the wall of the bore 16 (such as shown in FIG. 7) and there will be a low gain performance of the pressure relief valve 10 as compared to traditional pressure relief valve of FIG. 1. Attention is also directed to FIGS. 10 through 14 which compare the prior art device and the presently disclosed device and the variation in flows (see FIGS. 12 and 13). To further demonstrate the difference attention is directed to FIG. 9 which plots the open areas of the pressure relief valves (FIG. 1 (Prior Art) and FIG. 2 (Low Gain Embodiment)) with position of the valve body 30 within the bore 16 (Valve Position). The "Gain" is calculated using the formula of 8. The prior art design has a direct linear path for the relationship from after the start position. Whereas, the pressure relief device 10 of the present disclosure has a much lower gain, comparatively, with valve body 30 position.

As best shown in FIGS. 2, 3, 6, 7 and 11, and 13-17, the central or middle bore 16 of the valve housing 20 preferably includes a counterbore 17 located toward the lower end of the central bore 16 nearest the outlet 14 of the pressure relief valve 10. As such, the counterbore 17 is located at the intersection of the wall of the passage or bore 16 and the wall 18 of the outlet 14.

Figure 17:
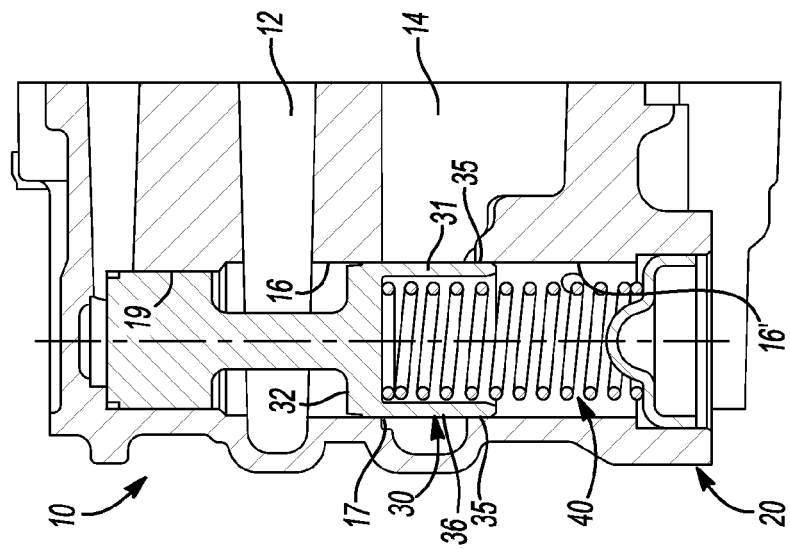
FIG. 17 is a partial section view of a pressure relief valve according to the embodiment of FIG. 2 and manufactured using a machining operation wherein the tool enters from the side.

In one particular embodiment, the counterbore 17 is preferably designed to have a linear extending surface 17a (see FIG. 11) perpendicular to the surface of the bore 16. The undercut counterbore 17 in the embodiment shown in FIG. 2 further includes a rounded corner 17c and opposite side wall 17b. While the counterbore 17 has the shapes as shown and described in the figures, it is contemplated that other shapes (elliptical, curvilinear, linear, partials and/or combinations thereof) and details of the counterbore 17 are possible. Further, as shown in FIG. 17 and discussed below, it is possible that the counterbore 17 may be present on only one side of the bore 16. Regardless of the shape of the counterbore 17, the extent of the surface 17a of the counterbore 17 is preferably formed perpendicular to the axis X of the housing 20 of the pressure relief valve 10 and perpendicular to the surface of the bore 16. The undercut counterbore 17 is preferably machined or formed in the housing 20 of the pressure relief valve 10 during production of the housing 20 and has a shape extending between the surface of the bore 16 and the wall 18 of the outlet port 14. While the counterbore 17 may be machined in the housing 20, such as by using a drill, inserted through the outlet 14 or from the bottom of the housing 20 when there is no spring or plug present, to perform a counterbore drilling operation, it should be understood that the counterbore 17 may be formed in the housing 20 using any known or appropriate machining or forming technique or operation. Any such alternative or known (or yet unknown) technique for providing a counterbore surface 17a. that is perpendicular to the axis X and the wall of the bore 16 will work to eliminate the draft angle Z from around the bore 16 is appropriate. For example, attention is directed to FIG. 17, in which a pressure relief valve 10, according to the present invention, includes a counterbore 17 in which substantially the wall 18 is machined flat (i.e., perpendicular to axis X) such that the undercut counterbore 17 is only seen on the one side (i.e., left in the picture) of FIG. 17.

Figure 16:
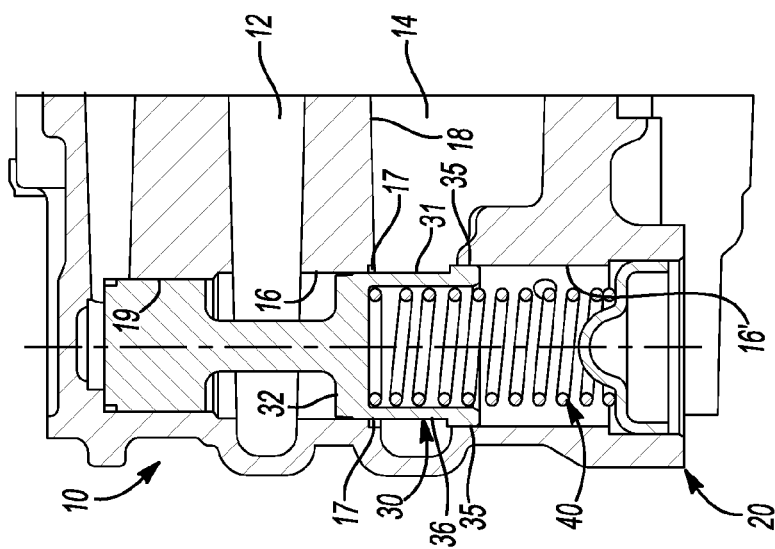
FIG. 16 is a partial section view of a pressure relief valve according to an alternative embodiment having a multiple diameter piston.

In one particular embodiment, shown in FIG. 16, the lower end 16' of the bore 16 has an enlarged (or increased diameter) lower end 35 as compared to the main portion 36 of the outer circumference 31 of the valve body 30. In this embodiment, the lower end 33 of the body valve 30 includes an extended diameter portion 35. Similar to the embodiment of FIG. 2, the bore 16 of the pressure relief valve 10 of FIG. 16, between the pilot inlet 13 and the inlet 12 includes a reduced diameter, upper bore portion 19 such that the upper and lower ends of the valve body 30 sliding within the bore 16 include added stability over the range of operation of the pressure relief valve 10. The operation for the pressure relief valve 10 of FIG. 16, which includes the undercut counterbore 17 and the reduced diameter portion 44 and tapered portion 45 on the piston 34, is similar to that of the embodiment of FIG. 2, so we now return to the pressure relief valve 10 and the progression of FIG. 7.

Figures 8, 9:
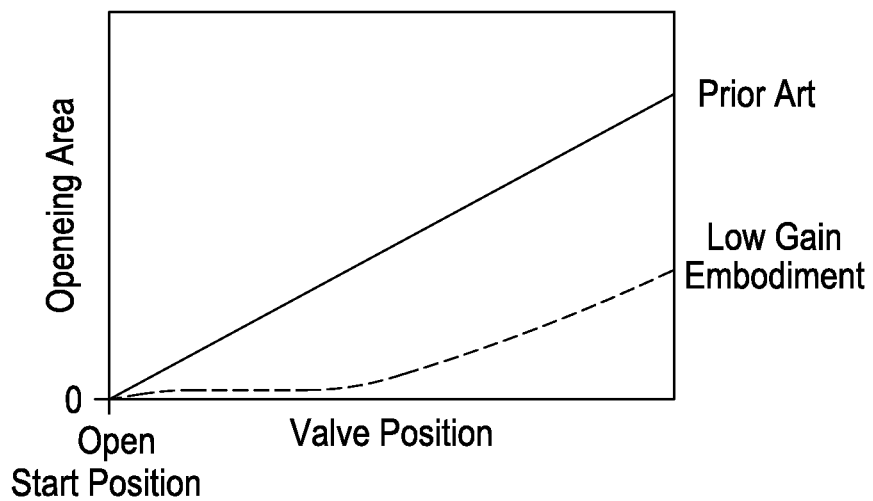
FIG. 8 is a formula defining valve gain in a pressure relief valve.
FIG. 9 is a graph of gain comparison chart for the pressure relief valve of FIG. 1 (prior art) and the pressure relief vale of the embodiment of FIG. 2 (low gain embodiment).
Figure 10:
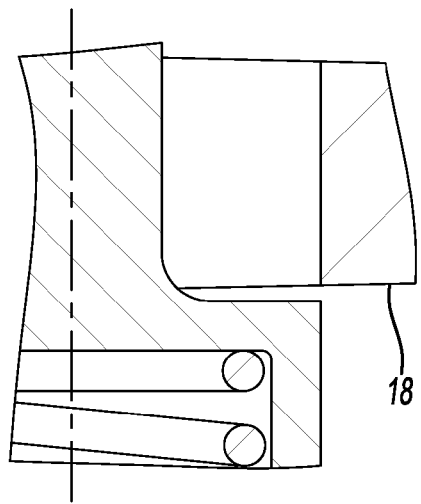
FIG. 10 is a partial section view of the pressure relief valve of FIG. 1 (prior art) detailing the gap between the piston and the housing wherein the pressure relief valve is moved from the closed position and toward an open position.
Figure 11:
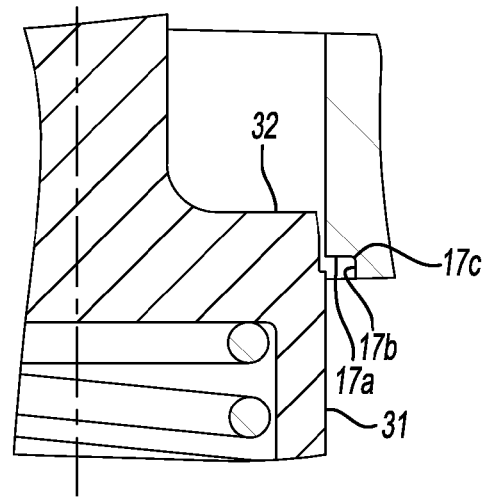
FIG. 11 is a partial section view of the pressure relief valve of the embodiment of FIG. 2 detailing the gap between the piston and the housing wherein the pressure relief valve is moved from the closed position and toward an open position.

Having the counterbore 17 perpendicular to the axis X and to the wall of the bore 16, results in the valve body 30 having a more balanced operation within the pressure relief valve 10. As best shown in the progression of images in FIG. 7, comparing the prior art device on the left and the pressure relief valve 10 of FIG. 2 on the right, it can readily be seen how the improved design of the pressure relief valve 10 of the present disclosure compares. Particular focus is directed to the 0.6 mm position in FIG. 7 where for the prior art device the left side of the top surface of the valve body is aligned with the wall 18 but the right side of the top surface of the valve body has cleared the wall 18 and an opening or gap is observed on only one side. Comparatively, the pressure relief valve 10 on the right side of FIG. 7 (according to the present disclosure), at the 0.6 mm position (all positions for that matter) shown the piston 34 of the valve body 30 is balanced around its entirety because undercut counterbore 17 is formed perpendicular to the axis X and the wall of the bore 16. Further consider the position of the Low Gain Embodiment of FIG. 7 at the 1, 2 and 4 mm open positions which demonstrate that the flow of fluid through the device will be gradual as shown in the graph of FIG. 9 and discussed above. Further, since the pressure relief valve 10 is now balanced it will not experience self-sustaining oscillations at relatively low pressures as occur in variable pressure oil pumps and/or those controlled with a pilot valve to operate at relatively low pressures. Further, the low gain pressure relief valve 10, as disclosed and taught herein, gradually releases oil and prevents rapid release of the oil and related pulsations. Finally, the low gain pressure relief valve 10, as disclosed and taught herein, will not experience jamming due to small particulates (such as those that may exist in the housing 20 from the casting manufacturing process or from other foreign sources) in the oil, as the prior art pressure relief valve would.

Any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. An apparatus for use as a low gain pressure relief valve, the apparatus comprising:
a valve housing having a bore including a wall, the valve housing and bore defining a longitudinal axis, the valve housing having an inlet port and an outlet port, the outlet port having a first wall and wherein the wall of the bore intersects with the first wall of the outlet port at an angle less than ninety degrees;
a valve body located within the passage and including a piston portion having at least one outer circumference portion, a top and a bottom, the at least one outer circumference portion blocking the inlet port of the valve housing when the valve body is located in a first or closed position and the at least one outer circumference portion for connecting the inlet port of the valve housing with the outlet port when the valve body is located in a second or open position and the piston portion of the valve body includes a first reduced diameter portion extending from the at least one outer circumference portion and toward the top of the piston, wherein the piston portion of the valve body further includes a tapered portion extending from the first reduced diameter portion and to the top of the piston and the tapered portion has an angle of between about 5 degrees and about 60 degrees from the wall of the outer circumference of the valve piston;
a biasing member for biasing the valve body toward the first or closed position, wherein the inlet port is for admitting a fluid to the top of the piston portion of the valve body to move the valve body against the biasing force of the biasing member and to connect the inlet port with the outlet port for expelling the fluid from the passage; and
wherein the bore of the valve housing includes a counterbore located at the intersection of the wall of the bore and the first wall of the outlet port, the counterbore including a first counterbore surface extending in a plane aligned perpendicular to the longitudinal axis of the valve body and perpendicular to the wall of the passage such that the plane of the first counterbore surface is not in the same plane as, and is at an angle with respect to, the first wall of the outlet port, wherein said counterbore creates an opening edge that eliminates contact between the wall of the bore and the first reduced diameter portion of the valve body.

2. The apparatus of claim 1 wherein the valve housing is casted from a metal material and the first wall of the outlet port has a draft angle of less than about five degrees.

3. The apparatus of claim 2 wherein the first wall of the outlet port has a draft angle of less than about two degrees.

4. The apparatus of claim 3 wherein the first wall of the outlet port has a draft angle of about one and one-half degrees.

5. The pressure relief valve of claim 1 wherein the tapered portion of the valve piston has an angle of between about 10 degrees and about 45 degrees.

6. The pressure relief valve of claim 5 wherein the tapered portion of the valve piston has an angle of about 10 degrees.

7. The pressure relief valve of claim 5 wherein the tapered portion of the valve piston has an angle of about 45 degrees.

8. The pressure relief valve of claim 4 wherein the tapered portion of the valve piston has an angle of between about 10 degrees and about 45 degrees.

9. An apparatus for use as a low gain pressure relief valve comprising:
a housing having a bore and defining a longitudinal axis and a wall of the bore, the housing having an inlet port and an outlet port, the outlet port including a first wall and wherein the wall of the bore intersects with the first wall of the outlet port at an angle less than ninety degrees;
a valve piston located within the bore and including at least one outer circumference portion defining a wall of the valve piston, a top and a bottom, the at least one outer circumference portion for engaging the wall of the bore of the housing and disconnecting the inlet port and the outlet port when the valve piston is located in a first or closed position and the at least one outer circumference portion disengaging from the wall of the bore and connecting the inlet port with the outlet port when the valve piston is located in a second or open position;
a spring for biasing the valve piston in a first direction toward the closed position, wherein the inlet port is for admitting a fluid from a high pressure side of a fluid lubrication system of an engine to the top of the valve piston to move the valve piston against the biasing force of the spring;
wherein the valve piston includes a first reduced diameter portion extending from the at least one outer circumference portion and toward the top of the piston and a tapered portion extending from the first reduced diameter portion and toward the top of the piston, wherein the tapered portion has an angle of between about 5 degrees and about 60 degrees from the wall of the outer circumference of the valve piston; and
wherein the bore of the valve housing includes a counterbore located at the intersection of the wall of the bore and the first wall of the outlet port, the counterbore including a first counterbore surface extending in a plane aligned perpendicular to the longitudinal axis of the valve body and perpendicular to the wall of the passage such that the plane of the first counterbore surface is not in the same plane as, and is at an angle with respect to, the first wall of the outlet port, wherein said counterbore creates an opening edge that eliminates contact between the wall of the bore and the tapered portion of the valve body.

10. The pressure relief valve of claim 9 wherein the valve housing is a casted metal material and the first wall of the outlet port has a draft angle of less than about five degrees.

11. The pressure relief valve of claim 10 wherein the first wall of the outlet port has a draft angle of less than about two degrees.

12. The pressure relief valve of claim 9 wherein the tapered portion of the valve piston has an angle of between about 10 degrees and about 45 degrees.

13. The pressure relief valve of claim 12 wherein the tapered portion of the valve piston has an angle of about 10 degrees.

14. The pressure relief valve of claim 12 wherein the tapered portion of the valve piston has an angle of about 45 degrees.

* * * * *